United States Patent
Kelly

(10) Patent No.: US 12,492,784 B2
(45) Date of Patent: Dec. 9, 2025

(54) SYSTEM AND METHOD FOR HIGH FLOW RATE LIQUID HYDROGEN TANK FILLING

(71) Applicant: Sean M. Kelly, Tonawanda, NY (US)

(72) Inventor: Sean M. Kelly, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 19 days.

(21) Appl. No.: 18/800,398

(22) Filed: Aug. 12, 2024

(65) Prior Publication Data

US 2025/0122979 A1    Apr. 17, 2025

Related U.S. Application Data

(60) Provisional application No. 63/590,898, filed on Oct. 17, 2023.

(51) Int. Cl.
*F17C 5/04*    (2006.01)
*F17C 13/00*    (2006.01)

(52) U.S. Cl.
CPC .............. *F17C 5/04* (2013.01); *F17C 13/002* (2013.01); *F17C 2221/012* (2013.01); *F17C 2227/0135* (2013.01)

(58) Field of Classification Search
CPC .... F17C 5/04; F17C 13/002; F17C 2221/012; F17C 2227/0135

See application file for complete search history.

(56) References Cited

U.S. PATENT DOCUMENTS

| | | | |
|---|---|---|---|
| 11,073,245 B2 * | 7/2021 | Bernhardt | F17C 6/00 |
| 2015/0068222 A1 * | 3/2015 | Hakamada | F17C 13/00 62/53.2 |
| 2015/0121905 A1 * | 5/2015 | Watts | F17C 7/04 137/1 |
| 2021/0341101 A1 | 11/2021 | Allidieres et al. | |
| 2023/0160529 A1 | 5/2023 | Light et al. | |
| 2023/0160533 A1 | 5/2023 | Demolliens et al. | |

\* cited by examiner

*Primary Examiner* — Timothy L Maust
(74) *Attorney, Agent, or Firm* — Robert J. Hampsch

(57) ABSTRACT

A system and method for high rate liquid hydrogen tank filling is provided. The flexible, pump-based filling system can achieve high fill rate of liquid hydrogen in excess of 100 kg per minute and accommodate maximum delivery pressures. The present system and method further includes recovery and re-liquefaction of displaced and flash generated tank vapors.

10 Claims, 2 Drawing Sheets

SYSTEM AND METHOD FOR HIGH FLOW RATE LIQUID HYDROGEN TANK FILLING

CROSS REFERENCE TO RELATED APPLICATIONS

This application claims the benefit of and priority to U.S. provisional patent application Ser. No. 63/590,898 filed on Oct. 17, 2023 the disclosure of which is incorporated by reference.

TECHNICAL FIELD

The present invention relates to filling transport tanks with liquid hydrogen, and more particularly, to a system and method for the high flow rate, low pressure transfer of liquid hydrogen from a supply tank to transport tank, such as a liquid hydrogen tanker or trailer for commercial transport of merchant liquid hydrogen.

BACKGROUND

Many conventional liquid hydrogen filling operations in the United States transfer liquid hydrogen from a hydrogen source tank such as a hydrogen sphere to a target tank such as a trailer tank via differential pressure where the source tank is at a higher pressure than the target tank. Flash vapor losses from the drop in pressure during the transfer from the source tank to the target tank are either vented to the atmosphere or recycled back to a hydrogen liquefier via a dedicated compressor or eductor. If the trailer tanks arrive at the filling location with a higher pressure than the source tank, or if trailer tanks arrive at the filling location in a generally warm condition, the trailer tank is typically conditioned by reducing the pressure of the trailer tank (i.e. blow-down) and/or cooling the warm trailer tank with liquid hydrogen. Significant vapor may be generated during the pressure reducing blow-down of the trailer tank, or the boil-off of liquid hydrogen that is used to cool down a warm trailer tank. These vapor losses are very often recovered if the vapor is recycled, but this trailer conditioning (e.g. blow down and cooling) takes time. Under typical conditions, the differential pressure filling process transfers liquid hydrogen at flow rates in the range of about 10-30 kg/min. At this transfer flow rate, a 3500 kg trailer tank fill will nominally take about 3 hours after target tank conditioning. Additional time is typically required to adequately condition the target tank.

Decarbonation initiatives are driving the transition toward hydrogen powertrains for heavy duty vehicles such as heavy duty trucks, freight rail, and aircraft. For the required payloads and distances in the use cases for these heavy duty vehicles, liquid hydrogen as a fuel source has significant advantages over compressed gaseous hydrogen. For heavy duty trucks, tanks of roughly 80 kg to 120 kg capacity are to be filled with subcooled liquid hydrogen at elevated pressures through specialized equipment. These liquid hydrogen fill applications have fill rates of about 100 kg/hour. For freight rail applications in the United States, tender rail cars comprising liquid hydrogen tanks and vaporizers are currently under development to supply hydrogen fuel to freight locomotives and hydrogen-based dual fuel locomotives. These liquid hydrogen tender rail cars under development for freight rail applications typically are designed with about 8000 kg of liquid hydrogen capacity.

What is needed therefore is a high flow rate liquid hydrogen filling system for filling of tender rail cars for locomotive or freight rail applications as well as filling of other liquid hydrogen tanks used in other heavy duty applications. For locomotive or freight rail applications, what is needed is a high rate liquid hydrogen filling system configured to fill tender rail cars with low pressure liquid hydrogen, preferably at pressures in the range of about 1 bar(a) to 8 bar(a) and at transfer flow rates in excess of about 6000 kg/hour or greater than about 100 kg/min which would serve as an enabler for economical large-scale shipment of liquid hydrogen. Such high rate liquid hydrogen filling system should also minimize vapor losses or flash losses of the hydrogen to a level of 5% or less while eliminating the extra time required for conditioning of the tender rail cars and minimizing the overall capital costs of the liquid hydrogen filling system. A liquid hydrogen filling system and method capable of filling tanks at such high fill rates in a safe manner would eliminate a key hurdle to the adoption of hydrogen technology for heavy duty applications such as the rail industry and facilitate development of safe standards for rail refueling systems and practices.

From a capital cost perspective, locomotive filling locations would require one or more liquid holding tanks typically filled as needed from local hydrogen plants using merchant liquid supply tractor-trailers. Locomotive driven tender rail cars would then be filled at high flow rates from the liquid hydrogen holding tanks. To minimize the capital costs, it would be advantageous to eliminate the need for a hydrogen liquefier present at the locomotive filling location while still recovering or recycling the hydrogen vapor created during the high flow rate fill process.

SUMMARY

The present invention may be characterized as a liquid hydrogen filling system, comprising: (a) a holding tank configured to store liquid hydrogen at a pressure that is less than or equal to 2.0 bar(a); (b) a first cryogenic pump configured to receive a stream of liquid hydrogen from the holding tank and pressurize the stream of liquid hydrogen to form an intermediate pressurized liquid hydrogen stream at a pressure greater than about 2.0 bar(a); (c) a heat exchanger disposed downstream of the first cryogenic pump and configured to warm the intermediate pressurized liquid hydrogen stream to a temperature between 26 Kelvin and 30 Kelvin via indirect heat exchange with a recycled gaseous hydrogen stream; (d) a second cryogenic pump disposed downstream of the heat exchanger and configured to further pressurize the warmed intermediate pressurized liquid hydrogen stream to form a fully pressurized liquid hydrogen stream at a pressure equal to or greater than about 4.0 bar(a); (e) a target tank disposed downstream of the second cryogenic pump and configured to receive the fully pressurized liquid hydrogen stream; (f) a recycle circuit having a first conduit configured to direct a saturated vapor hydrogen stream from a headspace or overhead of the target tank to the heat exchanger as the recycled gaseous hydrogen stream and a second conduit connecting the heat exchanger with the holding tank; and (g) an expansion valve disposed within the recycle circuit and configured to expand the subcooled liquid hydrogen recycle stream to form a dual phase hydrogen recycle stream at a pressure roughly equal to or slightly higher than the pressure of the liquid hydrogen in the holding tank. The heat exchanger is further configured to cool the recycled gaseous hydrogen stream to a subcooled liquid hydrogen recycle stream while the recycle circuit is further configured to direct the dual phase hydrogen recycle stream to the holding tank.

The present invention may also be characterized as a method of filling a tank with liquid hydrogen comprising the steps of: (i) pumping liquid hydrogen at a pressure that is less than or equal to 2.0 bar(a) from a holding tank via a first cryogenic pump and pressurizing the liquid hydrogen a pressure greater than about 4.0 bar(a); (ii) warming the pumped liquid hydrogen in a heat exchanger via indirect heat exchange with a recycled gaseous hydrogen stream to form a warmed liquid hydrogen stream and a subcooled liquid hydrogen recycle stream; (iii) further pumping the warmed liquid hydrogen to a target tank to a pressure equal to or greater than about 8.0 bar(a); (iv) recycling a saturated vapor hydrogen stream from a headspace or overhead of the target tank to the heat exchanger as the recycled gaseous hydrogen stream; (v) expanding the subcooled liquid hydrogen recycle stream to form a dual phase hydrogen recycle stream at a pressure roughly equal to or slightly higher than the pressure of the liquid hydrogen in the holding tank; and (vi) directing the dual phase hydrogen recycle stream to the holding tank.

In various embodiments of the above-described liquid hydrogen filling system and associated method, the recycling circuit further comprises a third conduit and a pressure adjustment valve disposed between the holding tank and the first conduit and configured to direct a stream of gaseous hydrogen from the headspace or overhead of the holding tank to the first conduit, wherein the stream of gaseous hydrogen is mixed with the recycled gaseous hydrogen stream.

Also in many embodiments of the present system and method, the flow rates of the liquid hydrogen through the first cryogenic pump and through the second cryogenic pump exceed 100 kg/min of liquid hydrogen. In such embodiments, the pressure of the holding tank is preferably in the range of 1.2 bar(a) and 2.4 bar(a) and the pressure of the target tank is preferably in the range of 4.0 bar(a) and 10.0 bar(a). Likewise, the temperature of the liquid hydrogen in the holding tank is preferably equal to or lower than 23 Kelvin and the temperature of the liquid hydrogen in the target tank is preferably equal to or greater than 26 Kelvin.

BRIEF DESCRIPTION OF THE DRAWINGS

It is believed that the claimed invention will be better understood when taken in connection with the accompanying drawings in which:

DETAILED DESCRIPTION

Figure 1:
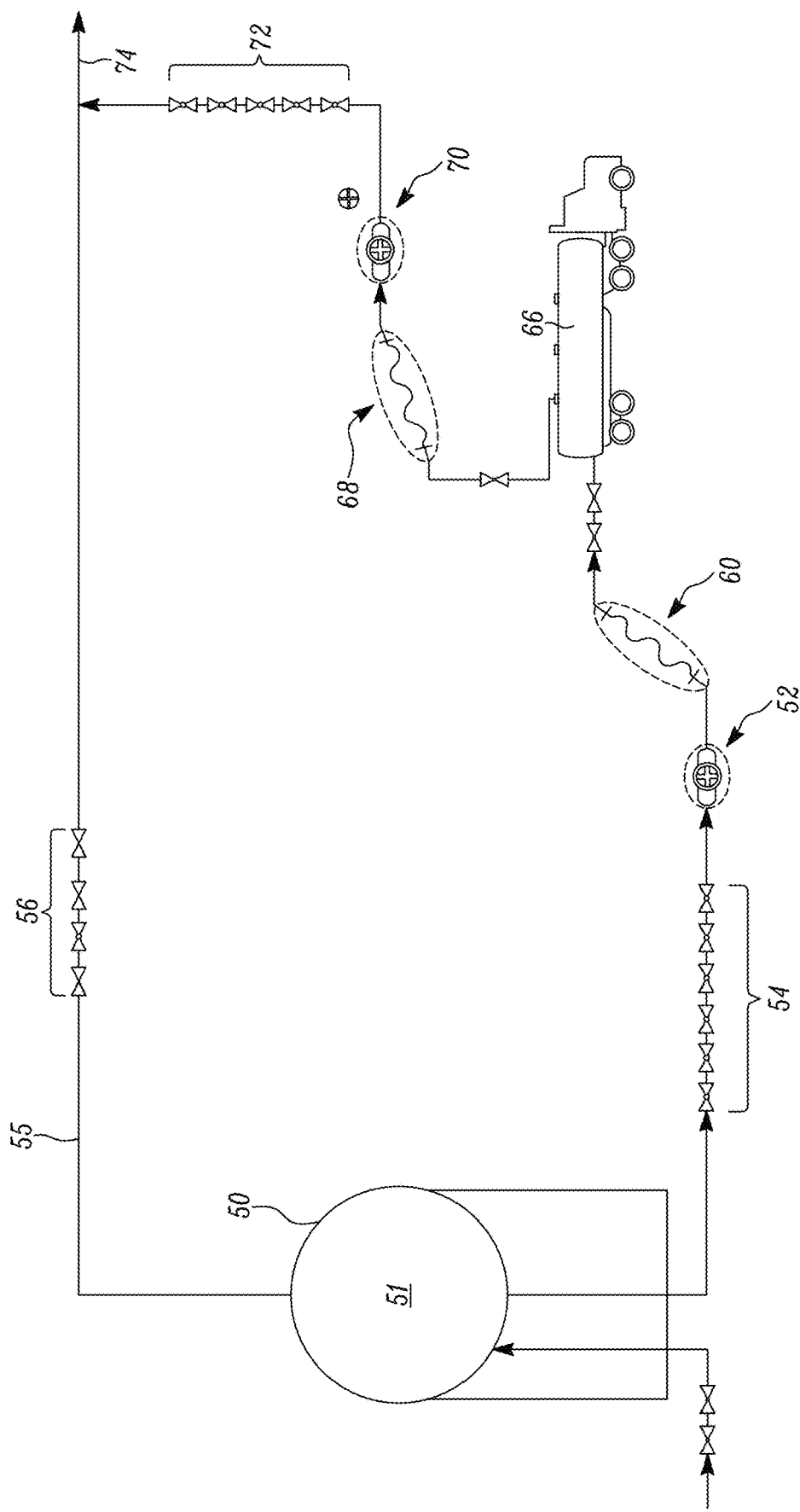
FIG. 1 shows a generalized schematic illustration of a conventional liquid hydrogen filling system and process from a holding tank to a target tank.

Turning to FIG. 1, there is shown a generalized schematic illustration of a conventional liquid hydrogen filling system and process to transfer liquid hydrogen from a holding tank to a target tank using a differential pressure mode of operation. In the illustrated schematic, liquid hydrogen is added to the holding tank from a liquid hydrogen source (not shown) such as a nearby hydrogen liquefier. The illustrated holding tank 50 holds up to 1.3 million gallons of liquid hydrogen at a pressure of about 1.3 bar(a). Liquid hydrogen is withdrawn from the holding tank and transferred to a fill bay 52 while being reduced in pressure by a series of valves 54 disposed upstream of the fill bay 52. The liquid hydrogen is then transferred from the fill bay 52 via a corrugated hose 60 to the target tank 66. Where the target tank is a trailer tank, as illustrated, it typically holds about 16,000 gallons of liquid hydrogen at a pressure less than the pressure of the holding tank 50. Prior to such transfer of liquid hydrogen to the target tank 66, the target tank is typically conditioned by blow-down (i.e. reducing the pressure of the target tank) and cooling of the target tank using a small stream of liquid hydrogen. The hydrogen vapor created during the conditioning step is typically vented to the atmosphere, flared or recycled to a recovery compressor.

During the conventional liquid hydrogen fill process depicted in FIG. 1, hydrogen vapor accumulating in the headspace or overhead of the target tank 66 is extracted from the target tank 66 and transferred via another corrugated hose 68 to a recovery bay 70. From the recovery bay 70, gaseous hydrogen is further reduced in pressure by another series of valves 72 and directed to a recycle circuit 74 which may include a recovery compressor (not shown). Hydrogen vapor accumulating in the headspace or overhead 51 of the holding tank 50 is also extracted from the holding tank 50 and transferred via another recycle line 55 where it is reduced in pressure via valves 56 and added to the recovered gaseous hydrogen from recovery bay 70. The recovered gaseous hydrogen from both the target tank 66 and the holding tank 50 is then compressed in the recovery compressor (not shown) and then re-liquefied in a hydrogen liquefier (not shown).

Figure 2:
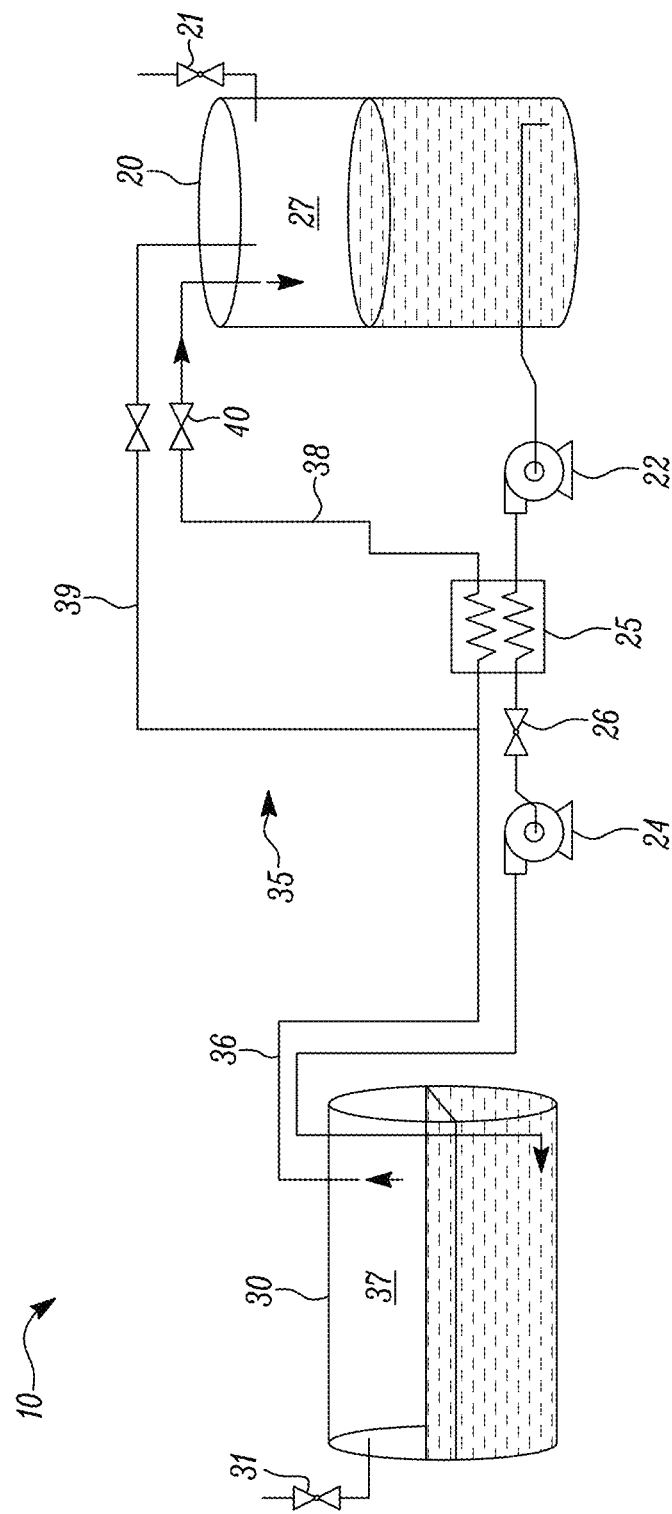
FIG. 2 shows a generalized schematic illustration of a high flow rate filling system and process from a holding tank to a target tank in accordance with an embodiment of the present invention.

Turning now to FIG. 2, the illustrated liquid hydrogen filling system 10 includes a holding tank 20, a first cryogenic pump 22, a brazed aluminum heat exchanger (BAHX) 25, a second cryogenic pump 24, associated valves 26, a target tank 30 with associated valves 21, 31 and an on-site recycle circuit 35. The illustrated on-site recycle circuit 35 in this embodiment includes a first conduit 36 configured to direct a saturated vapor hydrogen stream from a headspace or overhead 37 of the target tank 30 to the heat exchanger 25 where the gaseous hydrogen exits as a subcooled liquid hydrogen and a second conduit 38 that directs the recycled hydrogen from the heat exchanger 25 to the holding tank 20. Associated with recycle circuit 35 is an expansion valve 40 disposed within the recycle circuit 35 and configured to expand the subcooled liquid hydrogen recycle stream to form a dual phase hydrogen recycle stream at a pressure roughly equal to or slightly higher than the pressure of the liquid hydrogen in the holding tank 20. The illustrated embodiment also includes a third conduit 39 in the recycle circuit 35 that is configured to direct a stream of gaseous hydrogen from a headspace or overhead 27 of the holding tank 20 to the first conduit 36 in the recycle circuit 35, wherein the stream of gaseous hydrogen from the overhead 27 of the holding tank 20 is mixed with the recycled gaseous hydrogen stream. Disposed throughout the illustrated embodiment are appropriate valves, including relief valves 21, 31 associated with each of the holding tank 20 and target tank 30, respectively as well as pressure adjusting valve 42 in the third conduit 39 and an expansion valve 40 in the second conduit 38 of the recycle circuit 35.

For illustrative purposes only, the holding tank 20 may be configured to store liquid hydrogen at a pressure that is less than or equal to 2.0 bar(a). The first cryogenic pump 22 is configured to receive a stream of liquid hydrogen from the holding tank 20 and pressurize the stream of liquid hydrogen to form an intermediate pressurized liquid hydrogen stream at a pressure greater than about 2.0 bar(a).

The intermediate pressurized liquid hydrogen stream is then warmed in the heat exchanger 25 via indirect heat exchange with a recycled gaseous hydrogen stream or saturated vapor stream from the target tank 30 while concurrently cooling the recycled gaseous hydrogen stream to form a subcooled liquid hydrogen recycle stream. The warmed liquid hydrogen stream preferably exits the heat exchanger 25 at a temperature between 26 Kelvin and 30 Kelvin and is further pressurized via a second cryogenic pump 24 to form a fully pressurized liquid hydrogen stream at a pressure equal to or greater than about 4.0 bar(a), and more preferably to a pressure range of about 4.0 bar(a) and 10.0 bar(a). The fully pressurized liquid hydrogen stream is then fed to the target tank 30 which is not required to be conditioned as the pressure of the liquid hydrogen is preferably above the target tank and cooling of 'warm' target tanks is not required due to the rapid on-site recycling of any vapor losses caused when filling 'warm' target tanks.

The flow rates of the liquid hydrogen through the first cryogenic pump 22 and through the second cryogenic pump 24 are preferably equal to or greater than 100 kg/min of liquid hydrogen which significantly reduces the fill time compared to conventional liquid hydrogen fill systems. Such cryogenic pumps are available or can be designed to achieve the desired high flow rates by Cryostar™. In addition, the pressure of the holding tank is preferably in the range of 1.2 bar(a) and 2.4 bar(a) and the temperature of the liquid hydrogen in the holding tank is equal to or lower than 23 Kelvin whereas the temperature of the liquid hydrogen in the target tank 30 is equal to or greater than 26 Kelvin.

As indicated above, the recycle circuit 35 includes a first conduit 36 configured to direct a saturated vapor hydrogen stream from a headspace or overhead 37 of the target tank 30 to the heat exchanger 25 as the recycled gaseous hydrogen stream and a second conduit 38 connecting the heat exchanger 25 with the holding tank 20. There is also an expansion valve 40 disposed within the second conduit 38 of the recycle circuit 35 that is configured to expand the subcooled liquid hydrogen recycle stream to form a dual phase hydrogen recycle stream at a pressure roughly equal to or slightly higher than the pressure of the liquid hydrogen in the holding tank 20. The second conduit 38 is further configured to direct the dual phase hydrogen recycle stream back to the holding tank 20.

INDUSTRIAL APPLICABILITY

The present system and method for high rate liquid hydrogen tank filling can be used in many different liquid hydrogen filling applications but is most suitable for locomotive based or freight rail based applications that use tender rail cars to store and supply hydrogen fuel to freight locomotives and hydrogen-based dual fuel locomotives. These liquid hydrogen tender rail cars are designed with about 8000 kg of liquid hydrogen capacity and can be filled using the present system and method within about 80 minutes and without the need to spend additional time conditioning the tender rail car. For a freight locomotive filling applications, the tender rail car or target tank may be unconditioned (i.e. warm) or at pressures between about 1.25 bar(a) to the maximum safety limit for venting of about 10.0 bar(a).

Such high rate liquid hydrogen filling system and method should also minimize vapor losses to a level of 5% or lower as the present system and method offer high vapor recovery through re-liquefaction of hydrogen vapor in the heat exchanger and without the need for high capital cost items such as a separate recycle compressor or conventional hydrogen liquefier. Elimination of the target tank conditioning is enabled by the fact that if liquid hydrogen is flowing into the heat exchanger, then displaced vapor and flash vapor generated from a warm target tank, or vapor exhausted from a high tank pressure will mostly be re-liquified. Some vapor loss from process will always be present, but this process allows for much reduced losses and increased flexibility resulting in faster fill operations, less loss, and customer satisfaction.

While the present system and method have been described with reference to a preferred embodiment or embodiments, it is understood that numerous additions, changes, and omissions can be made without departing from the spirit and scope of the present invention as set forth in the appended claims.

What is claimed is:

1. A liquid hydrogen filling system, comprising:
    a holding tank configured to store liquid hydrogen at a pressure that is less than or equal to 2.0 bar(a);
    a first cryogenic pump configured to receive a stream of liquid hydrogen from the holding tank and pressurize the stream of liquid hydrogen to form an intermediate pressurized liquid hydrogen stream at a pressure greater than about 2.0 bar(a);
    a heat exchanger disposed downstream of the first cryogenic pump and configured to warm the intermediate pressurized liquid hydrogen stream to a temperature between 26 Kelvin and 30 Kelvin via indirect heat exchange with a recycled gaseous hydrogen stream;
    a second cryogenic pump disposed downstream of the heat exchanger and configured to further pressurize the warmed intermediate pressurized liquid hydrogen stream to form a fully pressurized liquid hydrogen stream at a pressure equal to or greater than about 4.0 bar(a);
    a target tank disposed downstream of the second cryogenic pump and configured to receive the fully pressurized liquid hydrogen stream;
    a recycle circuit having a first conduit configured to direct a saturated vapor hydrogen stream from a headspace or overhead of the target tank to the heat exchanger as the recycled gaseous hydrogen stream and a second conduit connecting the heat exchanger with the holding tank;
    wherein the heat exchanger is further configured to cool the recycled gaseous hydrogen stream to a subcooled liquid hydrogen recycle stream;
    an expansion valve disposed within the recycle circuit and configured to expand the subcooled liquid hydrogen recycle stream to form a dual phase hydrogen recycle stream at a pressure roughly equal to or slightly higher than the pressure of the liquid hydrogen in the holding tank; and
    wherein the second conduit of the recycle circuit is further configured to direct the dual phase hydrogen recycle stream to the holding tank.

2. The liquid hydrogen filling system of claim 1, wherein the recycle circuit further comprises a third conduit and a pressure adjustment valve disposed between the holding tank and the first conduit and configured to direct a stream of gaseous hydrogen from a headspace or overhead of the holding tank to the first conduit, wherein the stream of gaseous hydrogen is mixed with the recycled gaseous hydrogen stream.

3. The liquid hydrogen filling system of claim 1, wherein the flow rates of the liquid hydrogen through the first cryogenic pump and through the second cryogenic pump are equal to or greater than 100 kg/min of liquid hydrogen.

4. The liquid hydrogen filling system of claim 1, wherein the pressure of the holding tank is in the range of 1.2 bar(a) and 2.4 bar(a) and the pressure of the target tank is in the range of 4.0 bar(a) and 10.0 bar(a).

5. The liquid hydrogen filling system of claim 4, wherein the temperature of the liquid hydrogen in the holding tank is equal to or lower than 23 Kelvin and the temperature of the liquid hydrogen in the target tank is equal to or greater than 26 Kelvin.

6. A method of filling a tank with liquid hydrogen comprising the steps of:

pumping liquid hydrogen at a pressure that is less than or equal to 2.0 bar(a) from a holding tank via a first cryogenic pump and pressurizing the liquid hydrogen to a pressure greater than about 4.0 bar(a);

warming the pumped liquid hydrogen in a heat exchanger via indirect heat exchange with a recycled gaseous hydrogen stream to form a warmed liquid hydrogen stream and a subcooled liquid hydrogen recycle stream;

pumping the warmed liquid hydrogen to a target tank to a pressure equal to or greater than about 8.0 bar(a);

recycling a saturated vapor hydrogen stream from a headspace or overhead of the target tank to the heat exchanger as the recycled gaseous hydrogen stream;

expanding the subcooled liquid hydrogen recycle stream to form a dual phase hydrogen recycle stream at a pressure roughly equal to or slightly higher than the pressure of the liquid hydrogen in the holding tank; and directing the dual phase hydrogen recycle stream to the holding tank.

7. The method of claim 6, further comprising the steps of:

extracting a stream of gaseous hydrogen from a headspace or overhead of the holding tank;

adjusting the pressure of the stream of gaseous hydrogen with a pressure adjusting valve; and mixing the stream of gaseous hydrogen from the headspace or overhead of the holding tank with the saturated vapor hydrogen stream from a headspace or overhead of the target tank.

8. The method of claim 6, wherein the flow rates of the pumped liquid hydrogen and pumped warmed liquid hydrogen are equal to or greater than 100 kg/min of liquid hydrogen.

9. The method of claim 6, wherein the pressure of the holding tank is in the range of 1.2 bar(a) and 2.4 bar(a) and the pressure of the target tank is in the range of 4.0 bar(a) and 10.0 bar(a).

10. The method of claim 9, wherein the temperature of the liquid hydrogen in the holding tank is equal to or lower than 23 Kelvin and the temperature of the liquid hydrogen in the target tank is equal to or greater than 26 Kelvin.

* * * * *